INVENTOR.
HUGH E. SHAW JR.
BY Oscar L Spencer
ATTORNEY

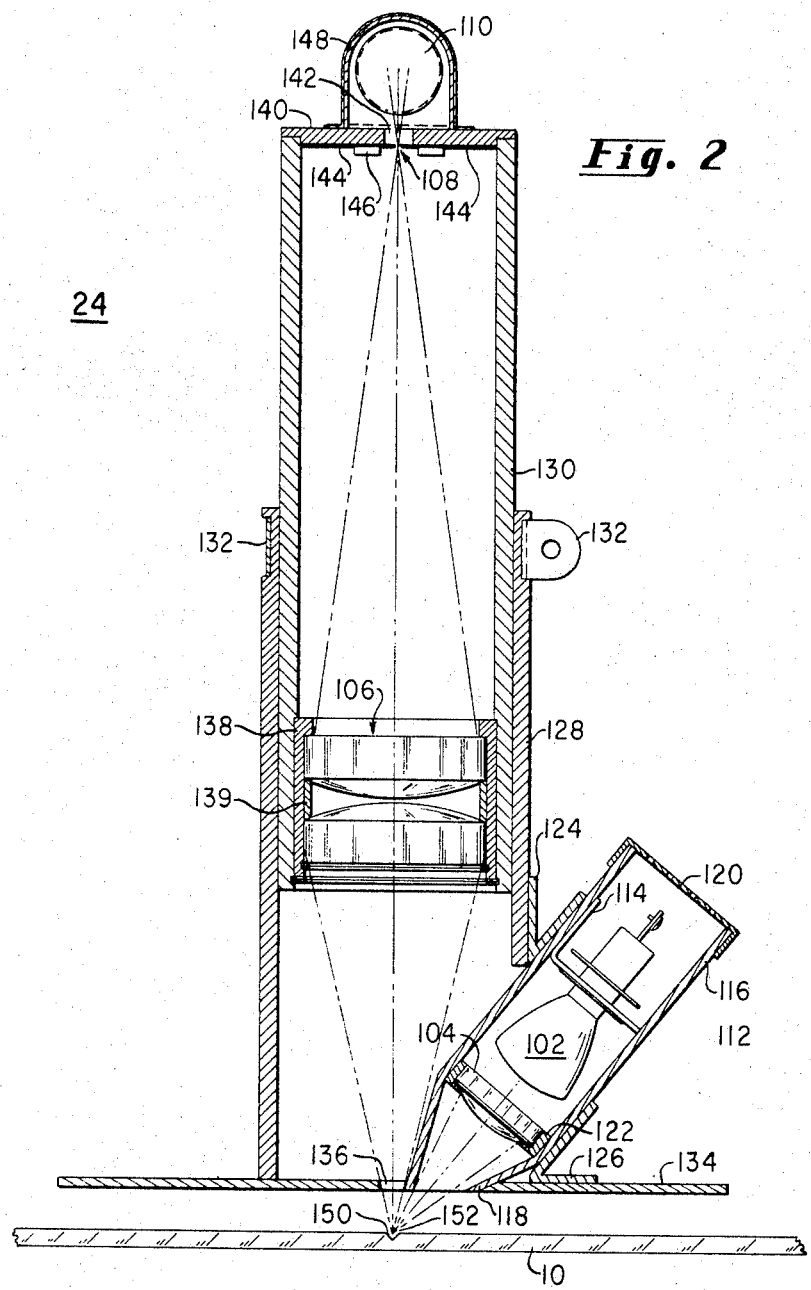

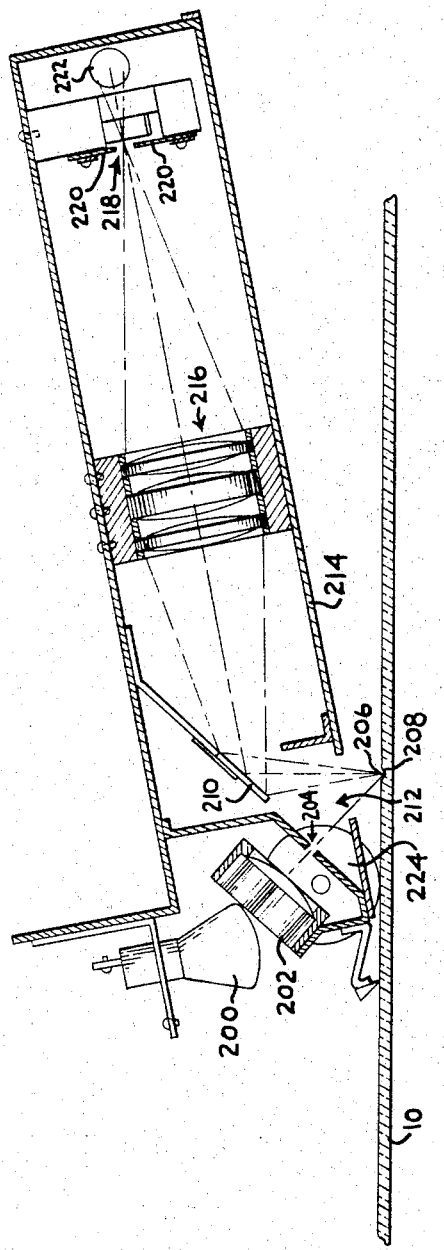

United States Patent Office 3,415,433
Patented Dec. 10, 1968

3,415,433
RADIATION SENSITIVE APPARATUS FOR SEVERING GLASS ALONG A SCORE MARK
Hugh E. Shaw, Jr., New Kensington, Pa., assignor to PPG Industries, Inc., a corporation of Pennsylvania
Continuation-in-part of application Ser. No. 189,142, Apr. 20, 1962. This application Jan. 28, 1964, Ser. No. 341,838
1 Claim. (Cl. 225—96.5)

This application is a continuation-in-part of my then copending application, Ser. No. 189,142, filed Apr. 20, 1962, now abandoned.

This invention relates to improved glass cutting techniques and in particular to a method and apparatus for sensing the presence of a score mark in a glass sheet.

In the manufacture of plate glass on a continuous basis there is obtained a continuous ribbon of glass. The ribbon is obtained by flowing molten glass from a tank furnace between a pair of rotating forming rolls, onto an apron and then onto rolls of a conveyor. The conveyor moves the glass ribbon through an annealing lehr and then along an uncovered section of the conveyor where the glass ribbon is cooled to a temperature sufficiently low to permit cutting of the glass ribbon. The ribbon is scored transversely to provide sheets of the desired length, either before grinding and polishing in a conventional plant or after grinding and polishing in a modern twin plant. The transverse score is opened up to run the cut and separate the glass sheet from the ribbon by use of a snapping device at a point farther along the conveyor.

To actuate the snapping device, the prior art has taught the use of either a simple time delay circuit energizing the snapping device a given time after the score is completed, or a travel sensing circuit which energizes the snapping device after the glass ribbon has traveled a certain distance, regardless of its speed.

One of the principal disadvantages of the two above-mentioned activating means is their lack of flexibility. One size of glass can be cut and only one size since the activating means do not sense the presence of the score mark itself but only some mechanical condition occurring after the score has been made.

Additionally, unless the snapping device is perfectly centered on the score mark, uneven moments are applied to the score mark. These uneven moments impair the quality and the strength of the cut by producing so-called "flare" and "shark's teeth." In previous practice it was virtually impossible to insure a perfect centering of the snapping device on the score mark utilizing the teachings of the prior art. The present invention alleviates the aforementioned difficulties.

In an effort to sense the presence of the score mark, it has been known to first score the glass sheet and then paint or chalk the score mark. The painted or chalked line could then be sensed optically and the snapping device energized in response thereto. However, such a method does not sense the score mark itself and, thus, in addition to necessitating an additional step, permits room for error and creates the possibility that the sensing device will sense an erroneously placed chalk mark or, what is worse, sense a dirt mark or smudge and interpret the same as a chalk mark and in response thereto activate the snapping device at an improper time.

In accordance with our invention, methods and apparatus have been provided to sense the actual score mark in the glass sheet, eliminating the need for an additional step of painting or chalking the score mark and, in addition, overcoming the above-mentioned disadvantages.

When a glass cutting tool such as a hardened steel wheel, a tungsten carbide wheel, or a properly oriented natural diamond edge is drawn over the surface of a sheet of glass, a score mark or line along which the glass may be divided is formed. Examined microscopically, such a score mark appears to be made up of a small groove in the surface of the glass sheet partially filled with crushed glass. A fissure extends downwardly into the glass from the groove and its depth depends upon the type of cutter, the speed and the pressure of the cutter. On each side of the fissure are systems of lateral cracks or "wings" in the region just below the glass surface.

In carrying out the teaching of the present invention, a beam of light is directed onto the surface of the scored sheet at an angle displaced from both the vertical and the horizontal and the glass sheet is passed thereunder in a direction perpendicular to the score mark. Intersection of the score mark and the light beam results in a random scattering of light rays eminating from the groove and fissure, which serve as the focal point, or more accurately, the focal line, of the scattering light rays. Preferably, the beam of light is elongated in the direction of the score mark.

In reality, the individual grooves and fissures act as tiny point light sources, so that the score mark appears to be a line of an infinite number of point light sources. The light rays from this line of point light sources, i.e., the score mark, are sensed by a properly oriented optical system and converted to an intelligible signal by a photosensitive device which then activates the snapping device.

With the present invention, the score mark acted upon by a snapping roll and from which the actual break in the sheet or ribbon of glass is generated may be sensed at the location where the cut is to be run, i.e., when it is in proper alignment with the longitudinal axis of a movable snapping roll, and the cut may be run essentially instantaneously upon being sensed, thereby assuring an extremely accurate placement of the snapping moment or force that severs the sheet or ribbon along the score mark. This arrangement particularly prevents the sheet or ribbon from being severed in advance of a plane perpendicular to the plane of the sheet or ribbon and passing through the longitudinally extending axis of the snapping roll, and thereby prevents the sharp leading edge of the trailing severed portion from colliding with the raised snapping roll and damaging both the leading edge and the roll.

This invention will be better understood from the following description of a plurality of embodiments of the invention taken in conjunction with the drawings in which:

FIG. 2 is a preferred embodiment of the sensing device of the present invention; and FIG. 3 is a second embodiment of the sensing device of the present invention.

Figure 1:
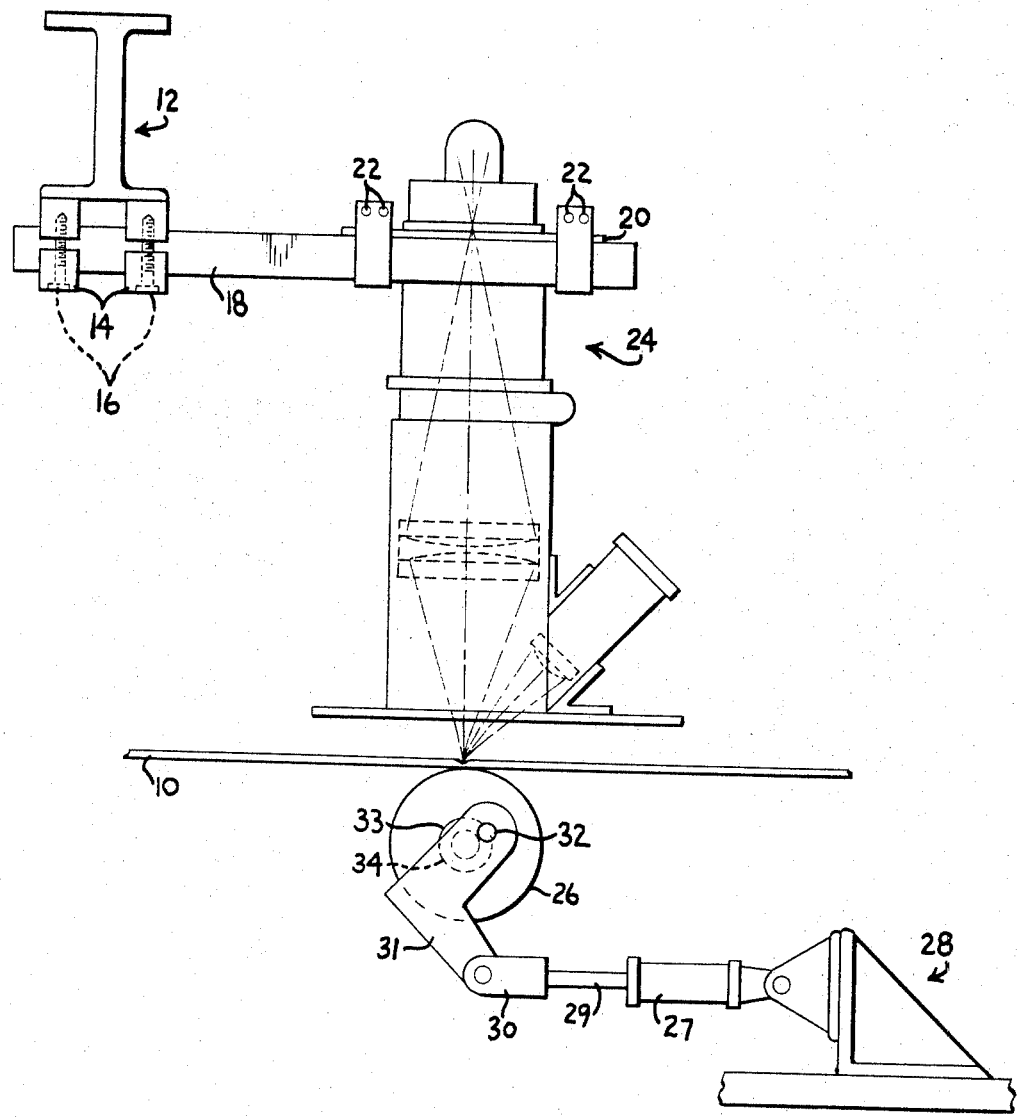
FIG. 1 is a view showing a mounting arrangement of a sensing device of the present invention in a preferred location to sense a score mark in snapping position above a movable snapping roll.

Looking to FIG. 1, a glass ribbon 10 is moved along a conveying table (not shown) by means of conveying rolls (also not shown), or the like. Disposed above the glass ribbon 10 is a mounting bridge 12 which is transverse to the glass ribbon 10. The lower portion of bridge 12 is of a U-shaped clamp configuration 14 with securing bolts 16. Clamp 14 attaches shaft 18 at one of its ends and secures it in a horizontal position. The other end of shaft 18 supports the plate 20 which is secured to shaft 18 by bolts 22. Mounted within the plate 20 and supported thereby is the sensing device 24 from which a beam of light is directed upon the ribbon 10 to sense a score mark when properly located for snapping. Below the glass ribbon 10 is a conventional snapping roll 26 which is urged upward, above the plane of the glass ribbon, in response to a signal from the sensing device 24, which energizes the solenoid of a conventional solenoid-operated, spring biased, 4-way valve (not shown). The valve is normally in closed position and, upon energization of the solenoid, connects a pressurized air source with an air cylinder 27 pivotally mounted to a frame member 28, as diagrammatically shown in FIG. 1. As a result, a piston rod 29 is extended. The piston rod 29 is connected by a clevis 30 to a crank arm 31, keyed to a roll supporting shaft 32 offset from the central longitudinal axis of roll 26. Shaft 32 is fastened to a bearing housing 33 in which a central shaft 34 of roll 26 is supported for rotation. Rotation of crank arm 31 rotates the offset supporting shaft 32 and raises roll 26 above the plane of glass travel, applying a force or moment that severs the sheet or ribbon along a score mark located above the roll. This construction is shown and described in more detail in copending application of Jay J. Brand, Ser. No. 12,223, now Patent No. 3,142,427 assigned to the assignee of the present application.

The sensing device 24 is mounted, in the embodiment shown, so that the optical axis of the system, i.e., the center axis of the light system, intersects a transversely extending score mark on the upper surface of sheet 10 when the score mark is in vertical alignment with the longitudinally extending axis of the vertically movable snapping roll 26. The glass ribbon is scored so that transverse score marks extend in a direction parallel to the longitudinal axis of the snapping roll.

The sensing device 24, viewed in FIG. 2, is basically comprised of a light source 102, a collector lens 104, objective lenses 106, a slit aperture 108, and a photosensitive device 110.

The lamp 102 of lamp assembly 112 is supported by an L-shaped member 114 mounted within a lamp housing 116 which has a rectangular cross section and a wedge shaped end 118. The end 118 of housing 116 defines a relatively narrow rectangular opening through which the light rays from lamp 102 may be passed. The other end of the lamp housing 116 is capped by a perforated plate 120.

The collector lens 104 is supported within the lamp housing by the annular holder 122 which has a rectangular perimeter corresponding to the shape of the housing 116 and a circular inner dimension to correspond to the shape of lens 104.

The lamp assembly 112 is supported by angle irons 124 and 126. Angle iron 124 is attached to cylindrical member 128, which in turn is secured to the cylindrical surface 130 by means of steel strap 132. Member 130 is supported by plate 20, as is best seen in FIG. 1. Angle iron 126 is attached to bottom plate 134 which in turn is supported by cylinder 128. Bottom plate 134 has a rectangular opening therein to receive the end 118 of lamp assembly 112 to provide a slot opening 136, the long dimension of which is parallel to the score mark, permitting the passage of scattered light rays as hereinafter described.

The objective lenses 106 are mounted within a cylindrical lens holder 138 and separated one from the other by the annular spacer 139. The lens holder 138 is mounted in the lower portion of the housing member 130. Housing member 130 is capped by plate 140 which has an elongated opening 142 at its center, which opening is in vertical alignment with slot opening 136.

The slit aperture 108 is defined within the rectangular opening 142, the long dimension of which is also parallel to the score mark, by narrow blades 114 which span the length of opening 142 and are secured to plate 140 by bolts 146. The photosensitive device 110, such as a photoelectric tube, is mounted so that its sensing element is in the vertical plane of slit 108. The photocell housing 148 securely mounts the device 110 on the plate 140 in the position just described.

All the elements above-described, with the obvious exception of elements 102, 104, 106, and 110, have a dull black metallic finish to minimize reflection and glare.

In operation, light rays from lamp 102 are collected by lens 104 into a narrow, converging beam and passed through slotted end 118 of housing 116 onto the glass sheet 10 as an elongated line parallel to the score mark 150. The glass sheet 10 is moving in the direction indicated in the drawings with the score mark transverse to the direction of travel. Preferably, the score mark is perpendicular to the direction of travel and the slit aperture 108 is similarly positioned.

The center axis of the light source in the embodiment depicted is disposed 40 degrees from the vertical and is so situated that its rays pass through the unscored portion of the glass sheet 10. The angular displacement, however, is not critical. The displacement selected must merely be at some angle between an orientation in the vertical plane, which will result in light being reflected back up into the objective lens system from the glass surface, and an orientation in a horizontal plane, which will result in a scattering due, not to the score mark, but to flaws throughout the surface of the glass.

As the glass sheet 10 moves under the assembly 24 the score mark 150 intersects the center axis of the light source. This point of intersection is termed the optical axis of the system 152. The groove, the crushed glass, and the "wings" of the score mark 150 act as point light sources located in the score mark. A substantial portion of the light rays eminating from this line of point light sources reaches the objective lenses 106. The objective lenses 106 constrict the light rays and transmit an elongated beam of light focused on the aperture 108 between blades 144. The image of the score mark thus being focused on the very narrow aperture 108 will permit the photosensitive device 110 to "see" a sudden change in light intensity.

The photosensitive device 110, as is known in the art, will convert the sudden change in light intensity, through a fast rise time circuit, to an electrical output signal which has a rise time equal to the change in light intensity and an amplitude proportional to the total light energy being transmitted by the aperture 108. If the output signal is of sufficient amplitude, that is, resulting ultimately from a scattering of light from the score mark, it can be used to activate any number of different triggering circuits in order to excite the snapping device 26, preferably instantaneously, but if desired, after a delay. The particular triggering circuit employed may be any one of a number of conventional designs such as a simple, relay activating, spring-loaded triggering circuit wherein the relay coil is activated by the output of the photosensitive device. In the embodiment shown and described in connection with FIG. 1, the output of the photosensitive device 108 triggers a solenoid operated valve controlling an air cylinder 27. The air cylinder 27 rotates a crank arm 31 that raises the snapping roll 26 into the plane of support of the ribbon or sheet at the instant the score mark is in a plane perpendicular to the ribbon or sheet and passing through the longitudinal axis of the roll 26.

A second embodiment of applicant's sensing device 24 is depicted in FIG. 3. A light source 200 radiates rays of light energy toward the collector lens 202 which in turn directs a constricted beam of light through slot opening 204 to thereby become an elongated beam. The beam of light intersects the surface of the moving glass sheet 10 at the optical axis of the system 206. Light rays are scattered from the score mark 208, the score mark serving as a line of point light sources, a portion of which rays reach the surface of mirror 210 through the slot opening 212 in the housing 214. The mirror 210 is so oriented as to direct the rays of light from the point light sources which reach its surface toward the objective lens system 216. The objective lenses 216 constrict the light rays to an elongated line of light. The now constricted light rays are focused upon the slit opening 218 between the edges of blade 220. As a result of this focusing of light upon the narrow opening 218, the photosensitive device 222 senses a sudden change in light intensity and converts its sensation into an electrical output signal as herein above described.

The sensing device depicted in FIG. 3 may be mounted on a bridge which is transverse to the moving glass sheet, similarly to the mounting arrangement of the preferred embodiment depicted in FIG. 1. For an additional degree of stability and accurateness, the two embodiments described in FIGS. 2 and 3 may be made to rest on the glass by means of roller wheels 224 (shown only with the embodiment depicted in FIG. 3) thereby maintaining the components of the system at exactly the same distance from the surface of the glass sheet, regardless of glass thickness.

Several features of the disclosed embodiments of the detector system of the present invention impart excellent "unwanted" signal rejection characteristics.

Parallel alignment of the aperture slit with the cutter score insures a low probability that randomly oriented defects, such as scratches, will trigger the system. Since, generally, a surface defect is not linear and, even if so, not parallel to the slit aperture, the scattered light rays from such a defect will not be randomly emitted from a line parallel to the slit aperture, as will the scattered rays from the score mark. The origin or focal point of the former rays not being in a line parallel to the slit aperture, fewer light rays will strike the photosensitive device than will be the case in rays eminating from the score mark. Therefore, the amount of light, or light intensity, which the photosensitive device "sees" is much less in the former situation, and not sufficient in magnitude to activate the triggering circuit to energize the snapping device.

In addition, light producing obstructions such as fingerprints and dust will also lack sufficient rise time and/or amplitude to develop an electrical signal sufficiently large to trigger the fast rise time circuitry which can be employed.

The individual sensing devices disclosed could be varied by the use of two or more photosensitive devices in substitution for the aperture slit. The physical makeup of the photosensitive devices now used would determine whether or not each would need an associated slit aperture. For example, no slits would be necessary if the devices would be aligned such that they would be simultaneously lighted by the image of the score. The outputs from the individual photosensitive devices would be fed to an "and" gate in such a manner that no output would be realized without simultaneous activation of the photosensitive devices.

The objective lenses could be omitted entirely from the detector system if the photosensitive device were moved nearer to the second glass surface.

In addition to the above-described modifications of the individual sensing devices, a plurality of sensing devices could be employed, disposed in a line transverse to the moving glass sheet, and which output signals will be directed to an "and" gate to insure that a signal will be generated only upon the actual presence of a score mark running the entire width of the moving glass sheet.

In the particular embodiment disclosed herein, the snapping roll is moved vertically upward to run the cut. This vertical movement may be either arcuate or rectilinear. Alternatively, the snapping operation may be performed while the score mark is located over a fixed position back-up roll with the snapping or cut running moments applied from the opposite side of the sheet or ribbon at locations spaced from the roll. Also in the particular embodiment disclosed, it is contemplated that the snapping force will be applied essentially simultaneously with the sensing of the score mark. Obviously the response of the snapping roll is not exactly instantaneous, because there is physical movement of the roll, although slight, and there is a minimal response time of the triggering circuit (on the order of microseconds). These may be correlated with the conveying speed at which the glass is traveling and the optical axis of the sensing device positioned a slight distance ahead, relative to the direction of glass movement, of the exact position at which the glass is to be snapped. However, the distance the glass travels during the response time is so small that any error induced thereby would be within cutting tolerances and therefore the adjustment may be ignored. Furthermore, any error would be in the form of a delay rather than a more harmful premature snapping. It is therefore intended that the terms "essentially simultaneous" or "essentially instantaneously" or the like, as used herein, contemplate methods and apparatus that either compensate for or disregard this slight delay occasioned by the inherent response time of the system.

It should be evident from the above that, while in the foregoing disclosure certain preferred embodiments of the invention have been disclosed, numerous modifications or alterations may be made therein without departing from the spirit and scope of the invention as set forth in the appended claim.

I claim:
1. Apparatus for severing a moving sheet of glass along a score mark on a surface of the glass which score mark will scatter light rays and extend transversely of the direction of movement of the sheet, comprising:

means to support and convey the sheets along a predetermined path;

a snapping means, including a horizontally disposed snapping roll across said path, and vertically movable with respect to the path of the glass sheet for severing the sheet along said score line;

a light source, means to direct a beam of light from said source onto the scored surface of the glass sheet, said light beam intersecting the score mark when located essentially directly above the axis of the snapping roll;

a lens holder positioned above said snap roll and in a spaced relationship with said glass;

an objective lens positioned within said holder;

an apertured cap closing off one end of said cylindrical lens holder;

a photocell mounted over said apertured cap, said photocell responsive to changes in intensity of said light beam when said light beam intersects said score line;

means operable in response to the sensing of the intersection of the beam with a score mark to actuate the snapping roll so as to sever the sheet along the intersected score line.

References Cited

UNITED STATES PATENTS

| | | | |
|---|---|---|---|
| 3,142,427 | 7/1964 | Brand | 225—104 |
| 3,274,390 | 9/1966 | Umbel | 250—219 |
| 2,050,315 | 8/1936 | Gulliksen | 250—219 |
| 2,429,331 | 10/1947 | Sachtleben | 88—14 |
| 3,033,991 | 5/1962 | Sampson | 250—219 |
| 3,141,589 | 7/1964 | Jochim | 83—365 |

WALTER STOLWEIN, *Primary Examiner.*

U.S. Cl. X.R.

250—219; 88—14; 83—365